April 28, 1953 W. THOMAS 2,636,288
DIGGING ANGLE ADJUSTMENT FOR ENDLESS BELT EXCAVATORS
Filed Jan. 31, 1947 11 Sheets-Sheet 1

Inventor
William Thomas
By Randolph & Beavers
Attorneys

April 28, 1953          W. THOMAS          2,636,288
DIGGING ANGLE ADJUSTMENT FOR ENDLESS BELT EXCAVATORS
Filed Jan. 31, 1947          11 Sheets-Sheet 6

Inventor
William Thomas
By Randolph & Beavers
Attorneys

April 28, 1953     W. THOMAS     2,636,288
DIGGING ANGLE ADJUSTMENT FOR ENDLESS BELT EXCAVATORS
Filed Jan. 31, 1947     11 Sheets-Sheet 9

Inventor
William Thomas
By Randolph & Beavers
Attorneys

April 28, 1953 W. THOMAS 2,636,288
DIGGING ANGLE ADJUSTMENT FOR ENDLESS BELT EXCAVATORS
Filed Jan. 31, 1947 11 Sheets-Sheet 10

Inventor
William Thomas
By Randolph & Beavers
Attorneys

April 28, 1953 W. THOMAS 2,636,288
DIGGING ANGLE ADJUSTMENT FOR ENDLESS BELT EXCAVATORS
Filed Jan. 31, 1947 11 Sheets-Sheet 11

Inventor
*William Thomas*

By *Randolph & Beavers*
Attorneys

Patented Apr. 28, 1953

2,636,288

UNITED STATES PATENT OFFICE 2,636,288

DIGGING ANGLE ADJUSTMENT FOR ENDLESS BELT EXCAVATORS

William Thomas, Klamath Falls, Oreg.

Application January 31, 1947, Serial No. 725,515

1 Claim. (Cl. 37—86)

This invention relates to a novel construction of machine adapted for use in placer mining, mining and in the moving of dirt generally and more particularly has reference to a portable machine constituting an improvement on my prior U. S. Letters Patent entitled Placer Mining Machine issued August 13, 1946, No. 2,405,622.

More particularly, it is an object of the invention to provide a machine of the aforegoing type which is adapted to be mounted on a suitable vehicle such as a land vehicle, a barge or amphibious vehicle for rendering the machine portable and the prime mover which may also be utilized for driving the moving parts of the mining or digging apparatus.

Still another object of the invention is to provide portably mounted machinery or apparatus for mining and dirt moving which is capable of being readily moved from an operative to an inoperative position to enable a vehicle upon which the machinery is disposed to be readily moved along a road or stream and which may be quickly and easily returned to an operative position without the necessity of connecting or disconnecting parts thereof.

Still a further object of the invention is to provide a machine equipped with means for treating material delivered thereto by the digging and conveying apparatus of the machine for separating precious metals from the dirt and for delivering and discharging the remainder of the diggings in any direction outwardly of the machine and at a considerable distance therefrom.

Still a further object of the invention is to provide an apparatus which, through simple adjustment of certain of the parts thereof, may be utilized for dredging stream beds at considerable depths or for excavating a relatively large area simultaneously.

Another object of the invention is to provide a machine or apparatus having means for separating large objects such as stones from the diggings and for conveying and discharging said objects at a point remote to the machine to thus enable a more efficient handling of the remainder of the diggings for the separation of precious metals therefrom.

Numerous other objects and advantages of the invention including those as set forth in my prior patent, previously referred to, are contemplated and will more readily become apparent as the description of the drawings proceeds.

In the drawings:

Figure 8 is a cross sectional view of the sluice box;

Figure 18 is a fragmentary side elevational view of a portion of the apparatus as seen in Figure 9;

Referring more specifically to the drawings, and first with reference to the form of the invention as illustrated in Figures 1 to 8, inclusive, the numeral 27 designates a tractor or other vehicle provided with a platform 28 and a suitable prime mover or engine 29 having a transversely disposed power take-off shaft 30. The placer mining, mining and dirt moving apparatus in its entirety is generally designated 31 and includes a pair of supporting arms 32 which are pivotally mounted on the tractor 27 coaxially with the shaft 30. The supporting arms 32, one of which is located adjacent each side of the tractor 27, are each provided with a forked outer end including a plurality of diverging arms 33 which are detachably connected at their extremities to the side edges of the intermediate portions of an endless conveyor frame 34 having shafts 35 and 36 journaled transversely of the ends thereof. Each of the shafts 35 and 36 carries two sprocket wheels 37 which are disposed between the side rails of the frame 34 and which sprocket wheels are in alignment to receive endless chains 38 which are trained thereover and disposed longitudinally of said frame 34. The chains 38 support a plurality of longitudinally spaced buckets 39 each of which is secured at its ends to the two chains 38 and which buckets diverge outwardly from the chains in the direction of rotation thereof, as indicated by the arrow 40 in Figure 1. The buckets 39 are provided at their outer, leading edges with digging teeth 41, and said buckets combine with the chains 38 to form an endless conveyor and digger.

Figures 1, 4, 26:
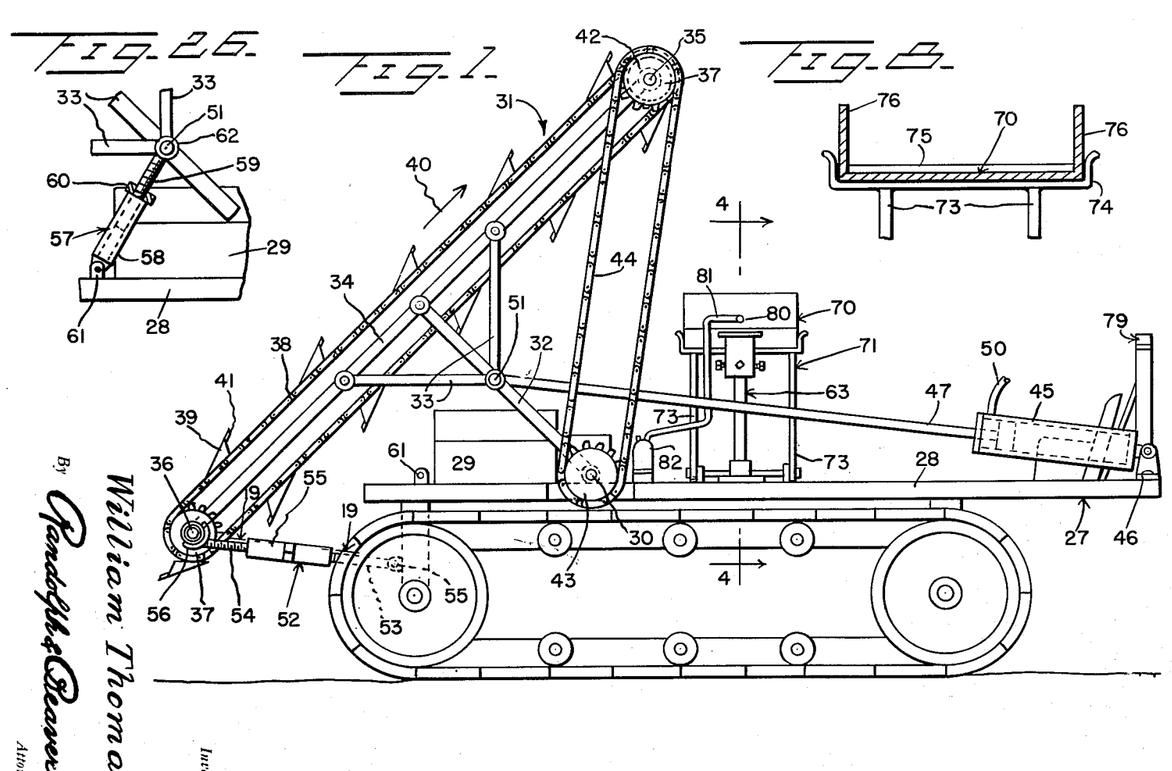
Figure 1 is a side elevational view of a preferred embodiment of the placer mining, mining and dirt moving machine or apparatus shown in an operative position.
Figure 4 is an enlarged transverse vertical sectional view taken substantially along a plane as indicated by the line 4—4 of Figure 1.
Figure 26 is a detailed view of a detachable locking means for holding the excavator or digger in an operative position.

As seen in Figure 1, a sprocket wheel 42 is keyed to one end of the shaft 35, which is disposed at the upper or rear end of the frame 34 and in alignment with a sprocket wheel 43 keyed to the shaft 30. An endless chain 44 is trained over the sprocket wheels 42 and 43 for driving the endless conveyor 38, 39 from the prime mover or engine 29 in the direction as indicated by the arrow 40. It will be readily apparent that similar sprocket wheels could be mounted on the opposite ends of the shafts 30 and 35 to receive a second chain for driving the shaft 35 from both sides of the endless conveyor if desired.

Figures 2, 7:
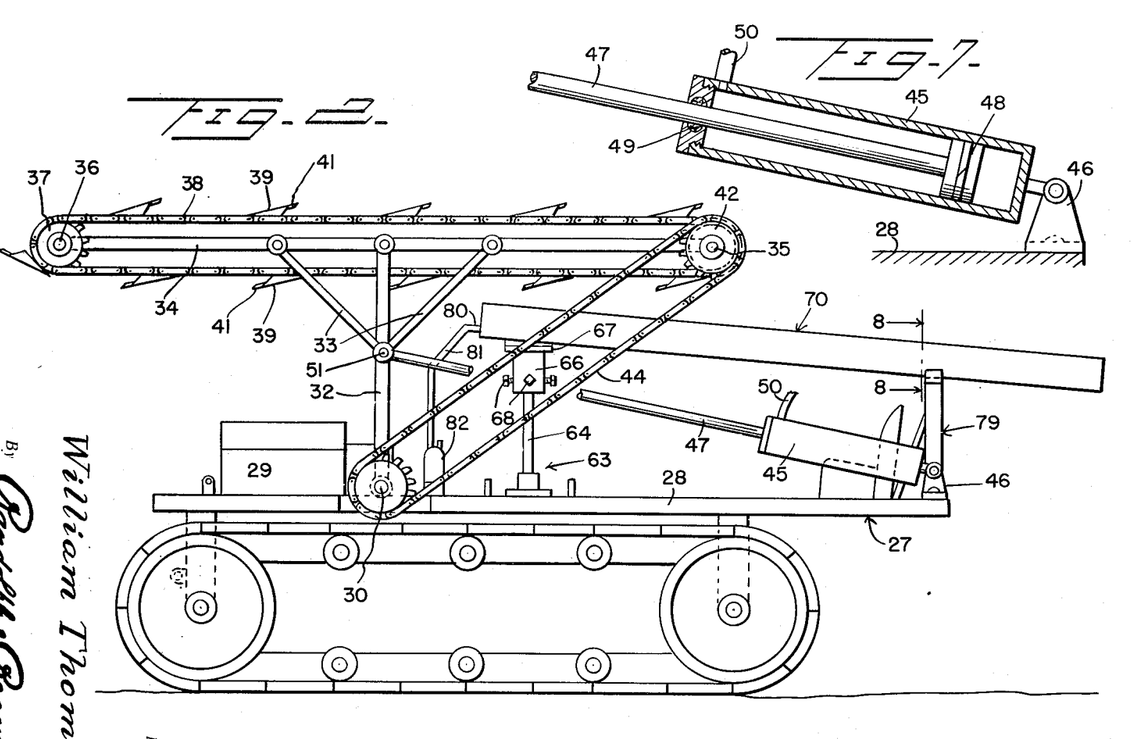
Figure 2 is a view similar to Figure 1 but showing the apparatus in an inoperative position as disposed for transportation.
Figure 7 is a longitudinal vertical sectional view, partly in side elevation of a portion of the ram used for raising and lowering the dirt digging and elevating mechanisms.
Figure 3:
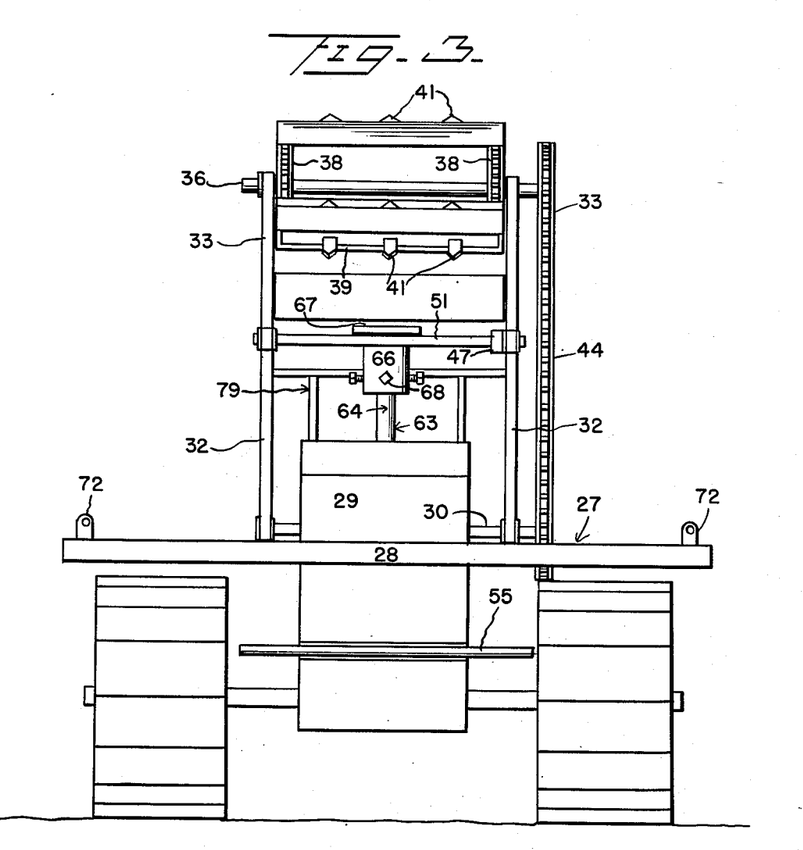
Figure 3 is an end view in elevation looking toward the forward end of the apparatus and with the parts in the positions as seen in Figure 2.

A hydraulic cylinder 45 is pivotally mounted at its rear closed end on a bracket 46 which is secured to the rear end of the platform 28 and has a piston rod 47 projecting slidably through the forward end thereof and which is provided with a piston 48 which is slidably disposed within the cylinder 45, as best seen in Figure 7. The forward end of the cylinder 45 is provided with a suitable stuffing box 49 through which the piston rod 47 reciprocally extends and has a feed conduit 50 communicating with the cylinder, adjacent said forward end, and which is adapted to be connected to any suitable source of hydraulic pressure. The opposite, forward end of the piston rod 47 is pivotally connected to a rod or shaft 51, as seen in Figure 3, which extends between the arms 32 and obviously, if desired, a second hydraulic cylinder could be utilized with the piston rod thereof connected to the shaft 51 adjacent the opposite side of the conveyor frame 34. The cylinder and piston combination combine to provide a hydraulic ram whereby, when pressure is applied thereto, the endless conveyor will be moved from its operative position of Figure 1 upwardly and rearwardly to substantially a horizontal, inoperative position as seen in Figure 2, in which latter position the endless conveyor is adapted to be disposed when the apparatus 31 is being moved from place to place portably on the tractor 27.

Figure 19:
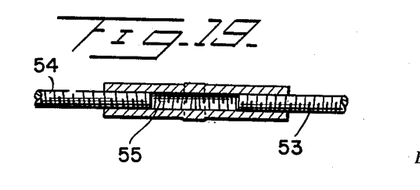
Figure 19 is an enlarged sectional view taken substantially along a plane as indicated by the line 19—19 of Figure 1.

As best seen in Figures 1 and 19, a pair of bearing supports, each designated generally 52 is provided for the shaft 36 when the endless conveyor is in its operative position of Figure 1. Each bearing support 52 includes a pair of screws 53 and 54 which are adjustably connected in spaced end-to-end relationship by a turnbuckle sleeve 55 which is interposed therebetween and which threadedly engages the adjacent ends of the screws 53 and 54. The outer end of the screw 53 is pivotally connected at 55 to the tractor 27, and the outer end of the screw 54 is provided with an arcuate bearing member 56 in which an end of the shaft 33 is journaled, so that the two adjustable bearings 52 effectively combine to journal and support the lower end of the endless conveyor when in an operative position. The adjustable bearing units 52 may be removed when the endless conveyor is disposed in its inoperative position of Figure 2.

The endless conveyor 38, 39 may also be further braced in its operative position by means of a pair of adjustable brace units each designated generally 57 and each comprising a threaded socket 58 for adjustably receiving a screw 59 having a locking nut 60. The outer, lower end of each socket 58 is pivotally connected to a bracket 61 which rises from the platform 28 and the outer end of each screw 59 is provided with an eye 62 for receiving an end of the rod or shaft 51, so that said brace units 57 will combine with the hydraulic ram or rams for effectively maintaining the endless conveyor in its operative position of Figure 1.

Figures 4, 5, 6, 14:
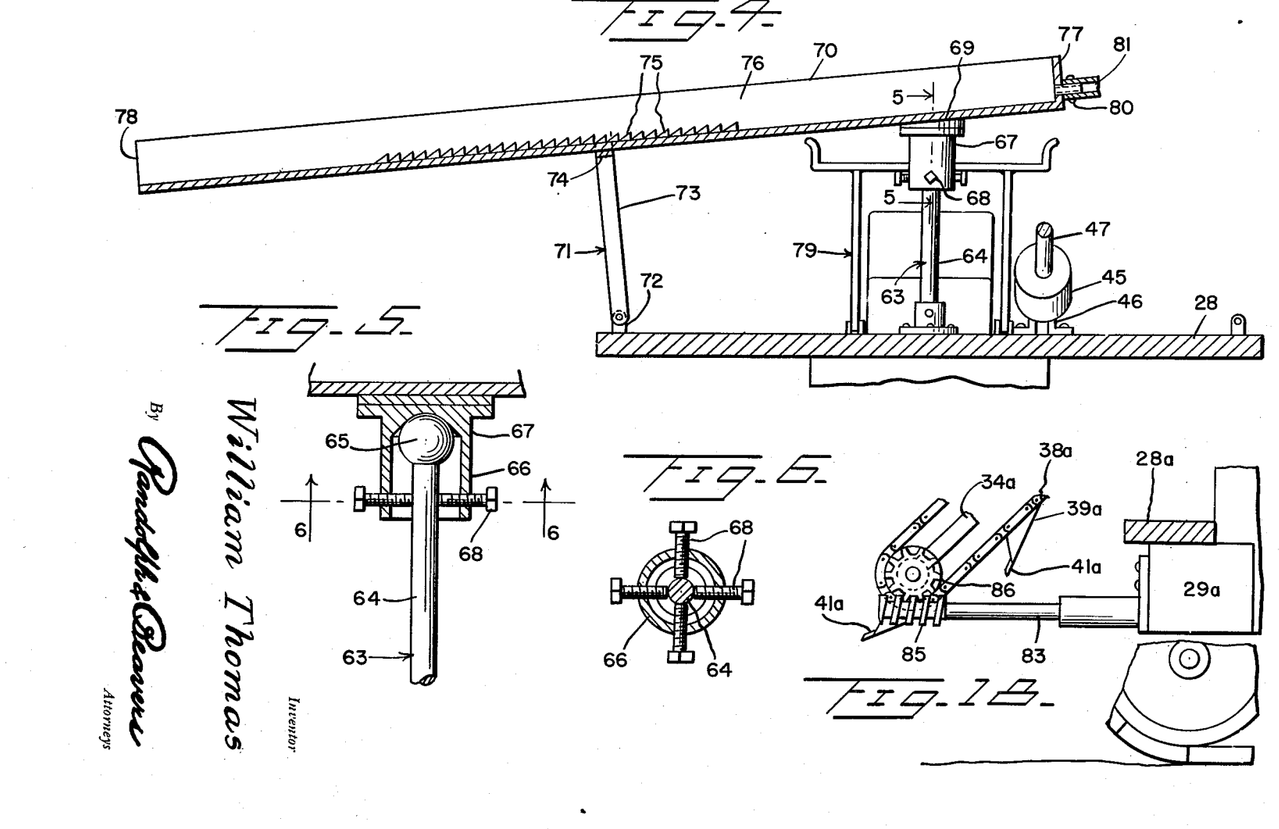
Figure 5 is an enlarged vertical sectional view taken substantially along a plane as indicated by the line 5—5 of Figure 4.
Figure 6 is a cross sectional view taken substantially along a plane as indicated by the line 6—6 of Figure 5.
Figure 14 is a side elevational view of a slightly modified form of supporting bracket for the endless conveyor.

A standard 63 is supported and rises from the platform 28 rearwardly of the endless conveyor when in its operative position of Figure 1. The standard 63, as best seen in Figures 5 and 6, includes a post 64 having a spherical upper end 65 which seats in a downwardly opening socket 66 of a head 67 of the standard 63. The lower portion of the socket 66 loosely surrounds the upper part of the post 64 and is provided with a plurality of inwardly extending set screws 68 which engage the post 64 for adjustably securing the head 67 thereon and which may obviously be adjusted for tilting the head to various angles relatively to the post. The head 67 is provided with an inclined upper surface 69 which is adapted to be either fixedly or slidably secured to the under side of a sluice box 70, adjacent the inner end thereof.

The platform 28 is provided adjacent one or both side edges thereof and substantially in transverse alignment with the standard 63, with a supporting bracket 71 which may be either pivotally or fixedly and detachably secured to brackets 72 rising from the platform 28. The supporting bracket 71 includes a pair of upwardly extending arms 73, as best seen in Figures 4 and 8, on the upper ends of which is fixedly mounted an upwardly opening yoke 74 which is adapted to receive and support the intermediate portion of the sluice box 70. The sluice box 70 is provided in its upper side and on the bottom thereof with riffles 75 for catching precious metals, as fully set forth in my prior patent, previously referred to. The sluice box 70 is provided with upstanding side walls 76, an inner end wall 77 and an open outer end 78 from which the tailings are discharged, normally laterally of the tractor 27.

As seen in Figure 4, a similar supporting bracket 79, corresponding to the bracket 71 is mounted at the rear end of the platform 28 and transversely thereof to receive and support the outer portion of the sluice box 70 when the latter is positioned longitudinally of the tractor 27, as seen in Figure 2, for transporting the apparatus. By loosening the set screws 68 the head 67 can be rocked on the standard post 64 so that the sluice box 70 can be disengaged from the bracket 71 and the head 67 can then swivel on the post 64 for swinging and positioning the sluice box, as seen in Figures 2 and 3.

A nozzle 80 extends through the inner end wall 77 of the sluice box 70 and is connected to a conduit 81 leading to a pump 82 mounted on the platform 28, as seen in Figures 2 and 4. The pump 82 may be connected to a suitable source of water supply, not shown, for supplying water under pressure to the sluice box for causing the mined materials to be conveyed along the bottom thereof for separating the precious metals from the tailings in the passage thereof over the riffles 75.

With the apparatus 31 in its position of Figure 1, it will be readily apparent that the endless conveyor and digger 38, 39 can be operated for placer mining, mining or dirt moving and that the digger blades or teeth 41 will dig into a surface, not shown, located beneath and adjacent the sprocket's wheels 37 as the individual buckets 39 move therearound. The material dug by the blades or teeth 41 will be deposited in the buckets 39 and conveyed upwardly as indicated by the arrow 40 and discharged by gravity as the buckets pass over the sprocket wheels 38 into the sluice box 70 adjacent its inner end. Obviously, if desired, a chute may be interposed between the upper sprocket wheels 37 and the sluice box. The treatment of the material after being discharged into the sluice box has been previously described. The hydraulic ram and adjustable bearing units 52 enable the conveyor to be set in operative position at various angles and so that the mining or dirt moving operation can be accomplished on surfaces disposed at various levels relatively to the tractor 27 and, if desired, the hydraulic ram piston rod 47 could be pivotally connected to the connections of any one of the arms 33 with the endless conveyor frame 34 in order to provide increased leverage or to enable the endless conveyor to be adjusted to a further extent. As the pivots of the supporting arms 32 are coaxial with the drive shaft 30, the endless conveyor can be moved from an inclined to a horizontal position or conversely without the necessity of removing the drive chain or chains 44. For certain earth moving operations the sluice box, or a conveyor substituted therefore, as will hereinafter be described, may be positioned as illustrated in Figure 2, longitudinally of the tractor 27 for discharging the earth to the rear of said tractor.

Figure 9:
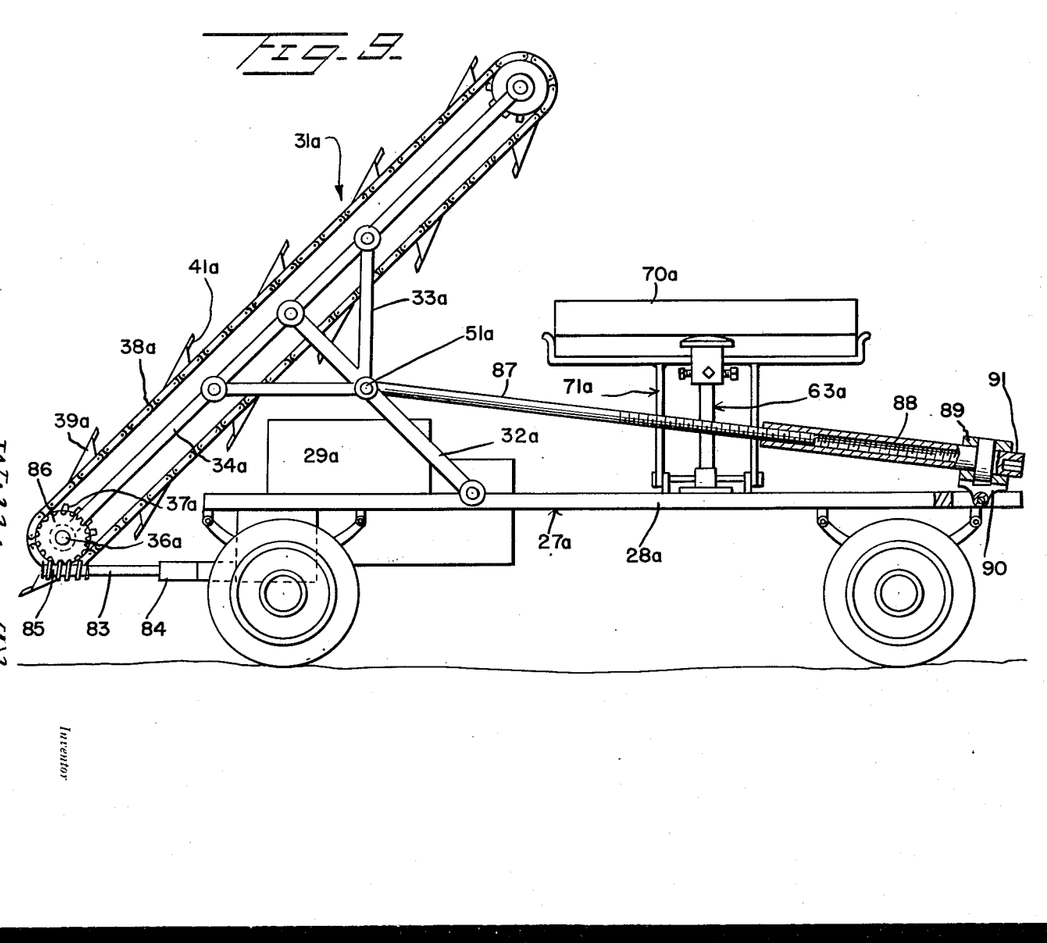
Figure 9 is a view similar to Figure 1 and showing a slightly modified form of driving connection for the digging and elevating apparatus.
Figure 10:
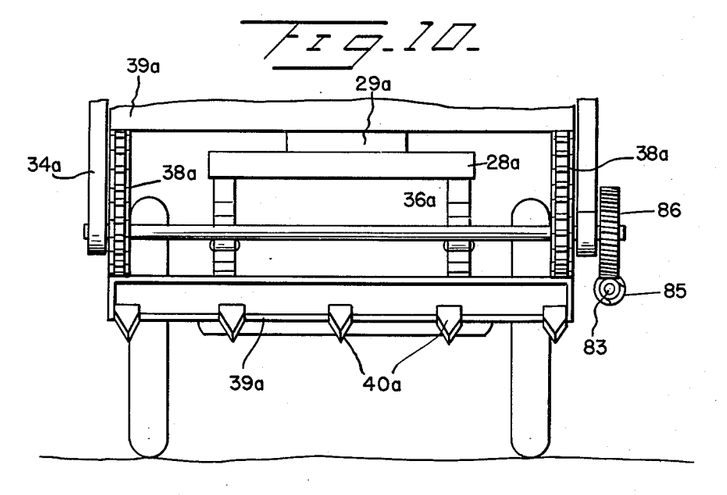
Figure 10 is a front elevational view thereof, illustrating only the lower portion of the apparatus.
Figures 11, 13, 14:
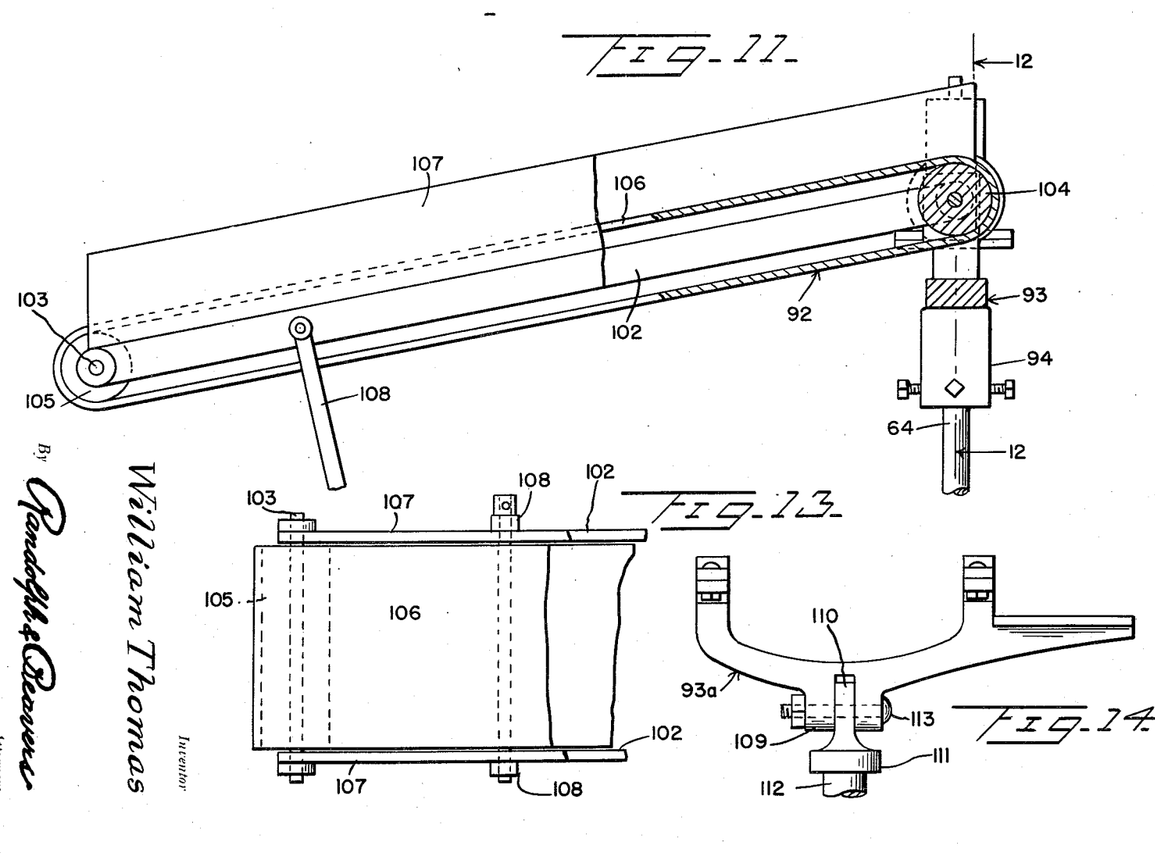
Figure 11 is a side elevational view, partly in longitudinal section illustrating a conveyor adapted for use in place of the sluice box when the apparatus is used primarily as a digger.
Figure 13 is a fragmentary top plan view of the outer end of the endless conveyor of Figure 11.
Figure 12:
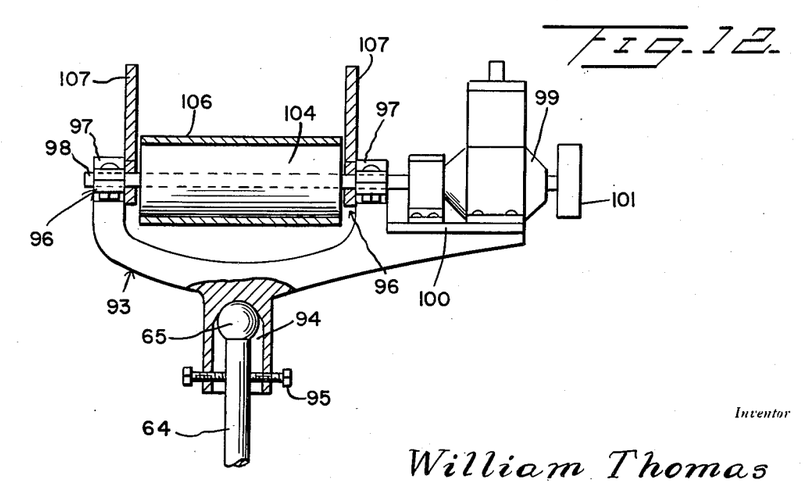
Figure 12 is a transverse vertical sectional view, partly in side elevation of one end of the endless conveyor taken substantially along a plane as indicated by the line 12—12 of Figure 11.

A slightly modified form of the invention is illustrated in Figures 9, 10 and 18 wherein the digging and conveying apparatus, designated generally 31a is shown mounted on a wheeled vehicle 27a which may either be provided with a prime mover or may be of the trailer type, in which latter case, the platform 28a thereof is provided with an engine 29a for actuating the conveyor and digger 38a, 41a. The engine 29a is located adjacent one end of the platform 28a and is provided with a laterally offset driven shaft 83 journaled in a housing 84 and provided at its outer end with a worm 85 which meshes with a worm gear 86 keyed to one end of the shaft 36a, located at the lower end of the conveyor frame 34a. The frame 34a is supported by arms 32a and 33a in the same manner as the frame 34.

In lieu of the hydraulic ram, a rod 87 is pivotally connected to the cross shaft or rod 51a and has a threaded rear end which threadedly engages a tube or sleeve 88 which is journaled in the sleeve 89 of a bracket 90 which is pivotally connected to the platform 21a. The sleeve 88 is provided at its outer end with a noncircular socket 91 to receive a suitably turning tool by means of which the sleeve 88 can be revolved for drawing the rod 87 into said sleeve or for threadedly ejecting it therefrom to raise or lower the conveyor frame 34a from its position of Figure 9 to a substantially horizontal position, similarly to the frame 34.

The platform 28a supports a standard 63a, corresponding to the standard 63 and on which a sluice box 70a, is supported in the same manner as the sluice box 70 by said standard and a bracket 71a, corresponding to the bracket 71.

As seen in Figure 10, the endless conveyor 38a, 39a is preferably relatively wide as compared to the endless conveyor 38, 39 and for this reason the shaft 83 is laterally offset outwardly forwardly of one of the ground wheels of the vehicle 27a, as illustrated in Figures 9 and 10. When the frame 34a is in an inclined, operative position, as seen in Figure 9, the worm gear 86 will be in mesh with the worm 85 to be driven thereby and so that the upper flight of the endless conveyor will be moving upwardly for causing the digger blades or teeth 41a to execute a digging operation as the buckets thereof pass over the sprockets 37a at the lower end of the endless conveyor. The earth or other material dug by the teeth or blades 41a and conveyed by the buckets 39a will be discharged therefrom by gravity onto the sluice box 70a in the same manner as previously described with the apparatus 31. In view of the previous detailed description of the apparatus 31, a further description of the apparatus 31a is considered unnecessary, except to state that obviously each end of the shaft 36a could be provided with a worm gear 86 and a second shaft 83 and worm 85 could be utilized for driving the endless conveyor at both sides of its lower end. Also, the vehicle 27a may be provided with endless traction members or half tracks as illustrated in Figure 18 in lieu of the wheels as seen in Figures 9 and 10.

Figures 11, 12, 13 and 14 illustrate a conveyor adapted to be used in lieu of the sluice box for conveying dirt away from either the tractor 27 or the vehicle 27a when the apparatus 31 or 31a is employed as a digging and dirt moving means. The endless conveyor, designated generally 92 includes a yoke shaped head, designated generally 93 having a depending socket 94, corresponding to the socket 66 and which is adapted to receive the spherical upper end 65 of the standard post 64 and to be secured thereto by set screws 95, corresponding to the set screws 68. The yoke shaped head 93 is provided with spaced upturned portions forming bearings 96 each having a separable upper section 97. The bearings 96 are adapted to journal a shaft 98 driven by a suitable motor 99 supported on a platform 100 forming an extension of the yoke 93. However, if desired, the shaft 98 may be driven by other power means through connection to a belt pulley 101 thereof. The endless conveyor 92 also includes longitudinally extending frame members 102 which extend outwardly from the bearings 96 and in the free ends of which an idler shaft 103 is journaled. A belt pulley or roller 104 is keyed to the shaft 98, between the bearings 96 and side members 102 and a similar belt pulley 105 is mounted on the shaft 103 between said side members 102. An endless conveyor belt 106 is trained over the pulleys 104 and 105 and is disposed between upstanding side wall members 107 which project upwardly from the frame members 102 and by means of which dirt or other matter conveyed and discharged onto the upper flight of said belt 106 will be prevented from falling laterally therefrom. The frame sides 102, at a point spaced from the post 64, are each provided with a depending supporting arm or standard 108 which may be anchored at its lower end, not shown, to either the platform 28 or platform 28a. The endless conveyor 92 may be of any desired length and it will be readily understood that dirt dug and conveyed by either the endless conveyor 39, 41 or 39a, 41a may be discharged onto the upper flight of the endless conveyor belt 106 and which is moving in a direction away from the yoke 93, for conveying the earth or dirt outwardly of the vehicle on which the structure is mounted and for discharging it at any desired distance therefrom, depending upon the length of the conveyor 92. A slightly modified form of yoke, designated generally 93a and illustrated in Figure 14 may be utilized as a part of the endless conveyor 92. The yoke 93a differs from the yoke 93 in that it is provided with a depending bifurcated and apertured portion 109 to receive a restricted apertured extension 110 of a head 111 mounted on the upper end of a post 112 which may be employed in lieu of the post 64. A bolt and nut fastening 113 extends through the apertures of the furcations 109 and through the aperture of the extension 110 for adjustably mounting the yoke 93a on the post 112 and so that said yoke may be adjusted to any angle and so secured by tightening the fastening 113.

Figure 15:
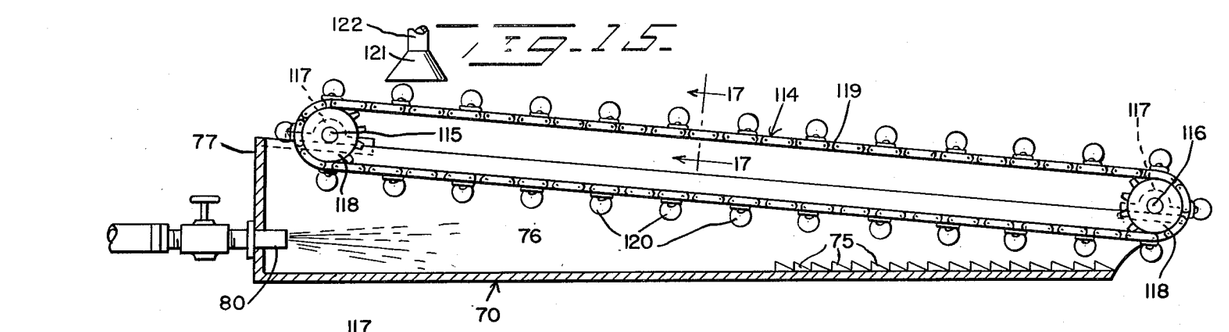
Figure 15 is a longitudinal vertical sectional view, partly in side elevation showing a modified form of sluice box and a separator for use in conjunction therewith for separating stones and rocks and other foreign matter from the earth and above the sluice box.
Figures 16, 17:
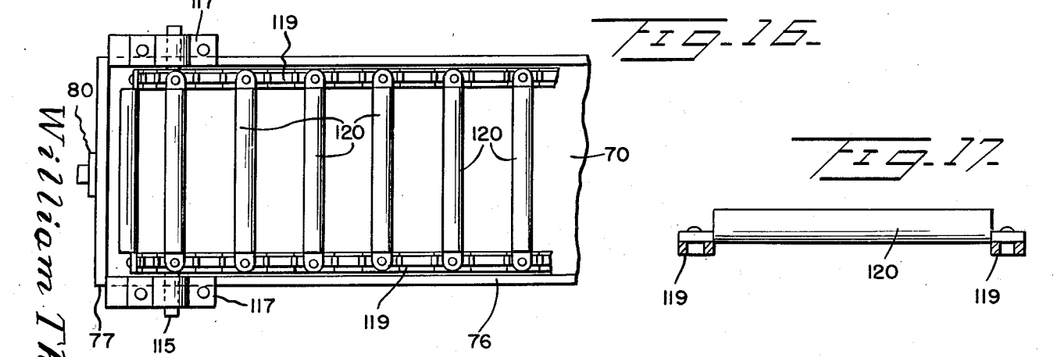
Figure 16 is a fragmentary top plan view of the inner end of the sluice box of Figure 15.
Figure 17 is a cross sectional view taken substantially along a plane as indicated by the line 17—17 of Figure 15.

Figures 15, 16 and 17 illustrate a revolving "grizzly" or separator for use with the sluice box 70 and which is designated generally 114 and includes spaced shafts 115 and 116 which are journaled in bearings 117 which are secured to the upper edges of the side walls 73 of the sluice box 70. The shafts 115 and 116 are disposed transversely of the sluice box 70 and each have a pair of spaced sprocket wheels 118 keyed thereto and with the sprocket wheels of the two shafts in alignment for receiving endless chains 119 which are trained thereover. A suitable driving connection, not shown, is provided, as for example between the prime mover 29 and the shaft 115 for driving the chains 119 so that the upper flight thereof will move in a direction away from the end wall 77 of the sluice box 70. Correspondingly disposed links of the chains 119 are connected at relatively close intervals by transversely disposed bars 120 which are mounted in any suitable manner to the outer sides of said chains and which are spaced a distance apart so that stones or other large objects discharged from the digger conveyors 39, 41 or 39a, 41a will lodge on the bars or rods 120 and be thereby separated from the normal tailings and precious metals which, as then unseparated, will drop between the bars 120 and into the sluice box 70 to be conveyed therealong by the liquid discharge from the nozzle 80, as previously described. The stones or other larger objects lodged on the upper flight of the chains and rods or bars will be conveyed therealong and discharged from the end of the conveyor or separator 114 which is remote to the end wall 77 and beyond the end of the sluice box 70 from which the tailings are discharged, so that it will be readily obvious that the separating apparatus 114 may be made of any desired length. A spray head 121 is preferably located above a portion of the conveyor chains and rods or bars 119, 120 and is connected by a conduit 122 to the same source of water supply as the nozzle 80 so that the water discharged therefrom will be sprayed onto the upper flight of the chains and bars or rods for separating the earth and precious metals from the stones or other objects lodged on said bars and for causing said earth and precious metals to drop into the sluice box.

Figure 20:
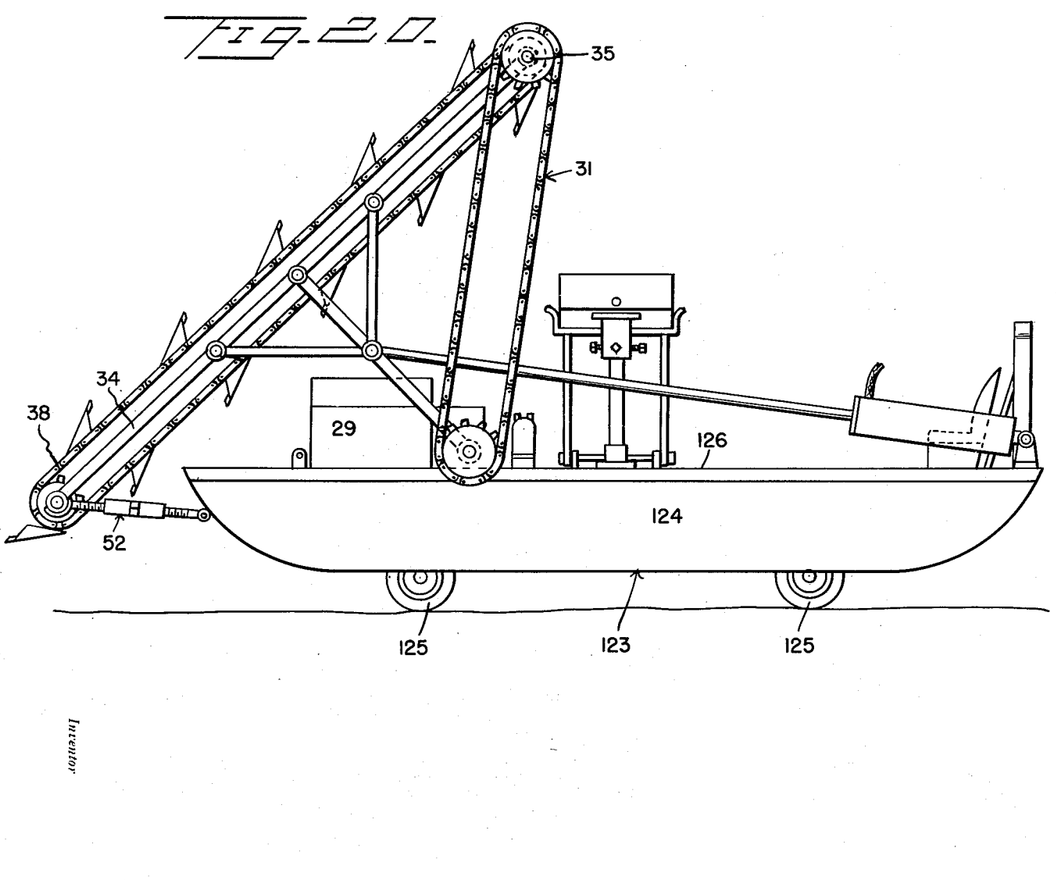
Figure 20 is a side elevational view, similar to Figure 1 showing the apparatus applied to an amphibious vehicle.

Figure 20 illustrates the apparatus, designated generally 31, mounted on an amphibious vehicle designated generally 123 and including a buoyant hull 124 having recesses to receive depending wheels 125 by means of which the amphibious vehicle 123 may move on land, supported by the wheels 125 or through a body of water, supported by the hull 124. The apparatus as illustrated in Figures 1 to 8 is shown mounted on the deck 126 of the hull 124 and the prime mover 29 thereof may also be utilized as the prime mover of the amphibious vehicle 123. The amphibious vehicle 123 is especially adapted for use in shallow streams certain parts of which are too deep for a normal land vehicle and other parts of which are too shallow for a boat or barge.

Figure 21:
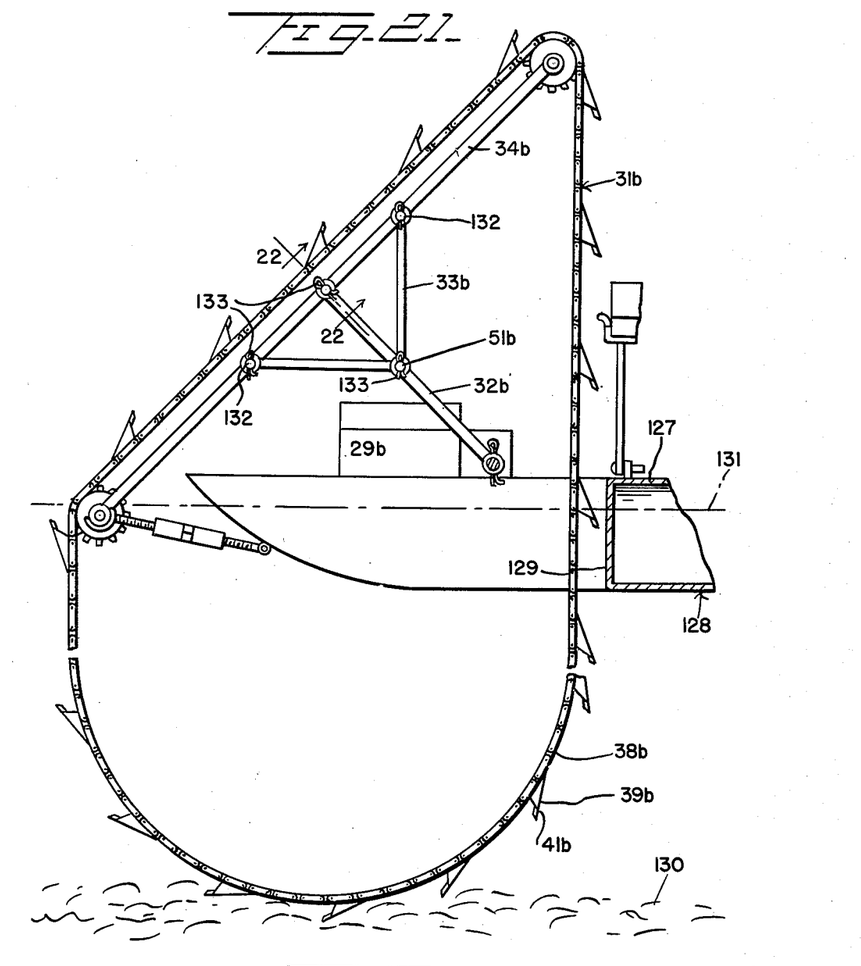
Figure 21 is a side elevational view, partly in vertical section of the forward portion of a modified form of the apparatus for use on a boat or barge and for use in dredging a stream bed or the bottom of another body of water.
Figure 22:
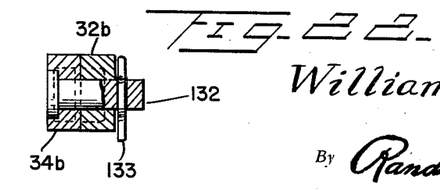
Figure 22 is a detailed sectional view taken substantially along a plane as indicated by the line 22—22 of Figure 21.

Figure 1 illustrates a portion of a slightly modified form of the apparatus, designated generally 31b and which is adapted to be mounted on the deck 127 of a boat or barge 128 which may also be an amphibious vehicle if desired and which is especially adapted for use in deeper water. The prime mover 29b of the apparatus 31b may also be utilized for propelling the boat or barge or amphibious vehicle 128 and may drive the conveyor digger structure either in the manner as illustrated in Figures 1 to 8, or as illustrated in Figure 9. The endless conveyor frame 34b is supported by the arms 32b and 33b in the same manner as in Figures 1 to 8 and 9 may be connected either to a hydraulic ram or screw adjustment means as illustrated in Figure 1 or Figure 9, respectively. The endless chains 38b differ from the chains 38 in that they are considerably longer so that the lower flight thereof will hang loose and will depend through a recess 129 in the forward end of the boat or barge 128 and to a substantial depth so that the buckets 39b will pick up earth from the bottom or bed 130 of a body of water 131 as dredged by the digger blades 41b. Obviously, the chains 38b may be made of any length for accommodating the dredging apparatus 31b to bodies of water of any depth and excess slack in the chains will not materially reduce the efficiency thereof. With the apparatus as illustrated in Figure 21, it will thus be readily apparent that mining operations can be efficiently and economically accomplished in the beds of relatively deep bodies of water. The connection between the arm 33b and the conveyor frame 34b preferably includes bolts 132 and cotter pins 133 to facilitate disassembling of the apparatus 31b and the rod or shaft 51b is preferably detachably connected to the arm 32b by additional cotter pins 133.

Figures 23, 24, 25:
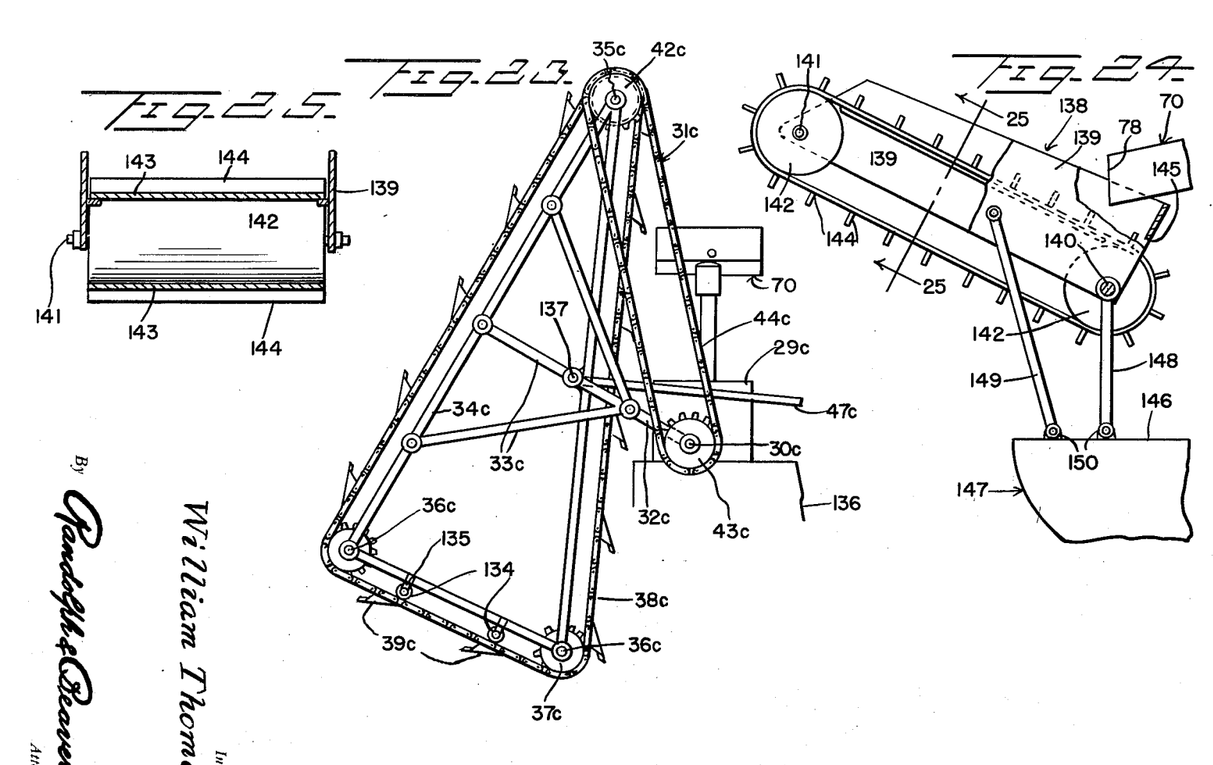
Figure 23 is a fragmentary side elevational view of a modified form of digging apparatus by means of which the digger operates on a larger area.
Figure 24 is a side elevational view of an endless conveyor apparatus for use in conjunction with a sluice box for catapulting the tailings away from the apparatus.
Figure 25 is a cross sectional view thereof taken substantially along a plane as indicated by the line 25—25 of Figure 24.

Figure 23 illustrates a modified construction of the apparatus, designated generally 31c and including a frame 34c which is generally triangular in shape in side elevation and in each of the two lower corners of which is journaled a shaft 36c over which the endless chains 38c are trained so that said chains and the buckets 39c, carried thereby, after passing over the upper sprocket wheels 37c move almost directly downwardly, under the lower and rearmost sprocket 37c of the lower, rearmost shaft 36c and thereafter generally outwardly and upwardly and under the sprocket wheels 37c at the lower, forward end of the frame 34c. The endless conveyor and digging apparatus as thus disclosed in Figure 23 is adapted for digging and conveying from a relatively large zone, substantially as defined by the distance between the outer portions of the lower sprocket wheels 37c. The frame 34c may be provided with idler rollers 134 supported by arms 135 for supporting the chains 38c in their movement between the sprocket wheels 37c to prevent said chains from being forced upwardly or inwardly relatively to the frame 34c by engagement of the diggers 41c and buckets 39c with the earth or other material, not shown, which is being dug and conveyed thereby.

The frame 34c is supported by arms 32c and 33c differing principally from the arms 32 and 33 in that the arms 32c are substantially shortened. The chains 38c are driven by a sprocket 42c keyed to the shaft 35c thereof and over which is trained an endless chain 44c which is likewise trained over a sprocket 43c keyed to the shaft 30c of the prime mover 29c of an amphibious vehicle, land vehicle or boat 136. The vehicle 136 may be either of the trailer type or the prime mover 29c may also constitute the prime mover thereof. The diggings from the buckets 39c are discharged into a sluice box 70 of the same construction as the sluice box 70, previously described, and which is similarly supported for receiving the diggings in the same manner, either with or without the separating apparatus as illustrated in Figure 15.

The conveyor frame 34c may be supported by a hydraulic ram, not shown, the piston rod 47c of which is preferably pivotally connected at 137 to the frame 34c, or a screw adjustment means such as illustrated in Figure 9 may be utilized for raising and lowering the endless conveyor frame 34c.

It is frequently required, especially in respect to mining stream beds, that tailings not be discharged back into the stream. In order to avoid extending the sluice box 70 to too great a length, a conveying and catapulting apparatus, as illustrated in Figures 24 and 25 and designated generally 138 may be provided. The apparatus 138 includes a frame 139 composed of side walls and an inner end wall and in which side walls are journaled a power shaft 140 and an idler shaft 141. The power shaft 140 is preferably disposed adjacent the inner ends of the frame 139 and the idler shaft 141 is located adjacent the outer end thereof. Said shafts have belt pulleys or rollers 142 keyed thereto over which is trained an endless belt 143 having spaced, laterally disposed and outwardly projecting slats 144. The belt pulley 142 of the shaft 140 is disposed in and the endless conveyor 143 extends through an opening 145 in the lower portion of the inner end wall of the frame 139. The frame and endless conveyor is supported preferably in an outwardly and upwardly inclined position relatively to the deck or platform 146 of a boat, barge or vehicle 147 by means of the brace rods 148 and 149 which are pivotally or rigidly connected at their lower ends to brackets 150 secured to the deck or platform 146. The upper end or ends of the braces or supports 148 are preferably journaled on the shaft 140 and the upper ends of the braces 149 are secured to the side walls 139, intermediate of the ends of the latter. The shaft 140 is adapted to be driven at a high rate of speed either by its own source of power, not shown, or by a driving connection, not shown, to the prime mover of the remainder of the apparatus, such as the prime mover 29. The discharge end 78 of the sluice box 70 is disposed to open into the frame 139, near the inner wall thereof and above the upper flight of the endless conveyor or belt 143. The tailing is discharged from the discharge end 78 or conveyed by the upper flight of the belt 143 in a direction toward the outer, open end of the frame 139 and at a high rate of speed so that the slats 144 will catapult the tailings outwardly from the vehicle 147 to a considerable distance.

Various modifications and changes are contemplated and may obviously be resorted to, without departing from the spirit or scope of the invention as hereinafter defined by the appended claim.

I claim as my invention:

The combination in a mining and dirt moving machine having a driven endless conveyor and digger supported on a mobile supporting structure for swinging movement relatively to the supporting structure between an inclined-operative position and a horizontal inoperative position and including a transversely disposed shaft located at one end of the endless conveyor, of an adjustable thrust bearing for supporting the lower end of the conveyor in an inclined-operative position and at different angles and elevations, said thrust bearing having an inner end pivotally connected to an end of the supporting structure for swinging movement in a vertical plane and having an outer-forward end provided with an arcuate bearing element having a forwardly facing concave surface bearing against and journalling said transverse shaft for supporting the conveyor in an inclined position, said thrust bearing including extensibly connected end sections for varying the length thereof to support the endless conveyor in inclined positions at different angles and with its lower end at different elevations.

WILLIAM THOMAS.

References Cited in the file of this patent

UNITED STATES PATENTS

| Number | Name | Date |
|---|---|---|
| 622,532 | Postlethwaite | Apr. 4, 1899 |
| 635,958 | Fishback | Oct. 31, 1899 |
| 677,844 | Des Granges | July 2, 1901 |
| 854,702 | Proctor | May 21, 1907 |
| 921,252 | Huelsdonk | May 11, 1909 |
| 964,567 | Seberg | July 19, 1910 |
| 1,023,156 | Kosmin | Apr. 16, 1912 |
| 1,046,300 | Jackson | Dec. 3, 1912 |
| 1,408,299 | Holley | Feb. 28, 1922 |
| 1,728,652 | Barber | Sept. 17, 1929 |
| 1,770,552 | Robb | July 15, 1930 |
| 1,842,193 | Penote | Jan. 19, 1932 |
| 2,405,622 | Thomas | Aug. 13, 1946 |
| 2,454,840 | Ryan | Nov. 30, 1948 |